July 27, 1954
C. H. FROBERG, JR
2,684,604
UNIVERSAL KNURLING TOOL
Filed Sept. 21, 1950
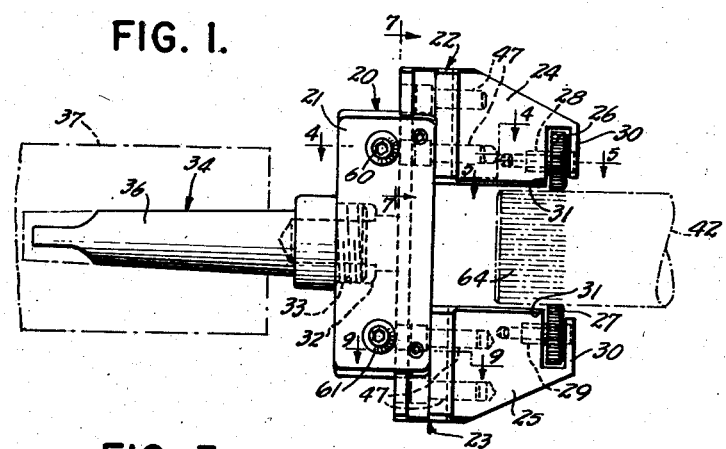
Inventor
CHARLES H. FROBERG, JR.
By
Charles A. Morton
Attorney

Patented July 27, 1954

2,684,604

UNITED STATES PATENT OFFICE 2,684,604

UNIVERSAL KNURLING TOOL

Charles Henry Froberg, Jr., Brentwood, N. Y.

Application September 21, 1950, Serial No. 186,009

8 Claims. (Cl. 80—5.1)

This invention relates to a universal knurling tool, that is, to a knurling tool which can be variously fitted to the tail stock of a lathe, or to the turret of a Fox lathe or turret lathe, or to a hand screw machine, and which is both adjustable and reversible to knurl either a male or a female knurl of varying length upon work of different sizes, thus combining in one single device a tool which can be utilized for a large variety of purposes.

One object of this invention is a universal knurling tool.

Another object is a knurling tool which by a mere reversal of parts can be rapidly converted from a tool for making male knurls into a tool for making female knurls, and back again.

Another object is a knurling tool capable of forming either a male or a female knurl of any desired length, upon work of any desired size.

Another object is a knurling tool having a series of detachably attachable interchangeable and reversible parts, whereby the knurling tool can be utilized for many different purposes, thereby substantially reducing the number of knurling tools which are needed to fully equip a machine shop with a complete range of knurling tools, capable of performing a substantially endless variety of knurling operations.

Another object is a knurling tool of but few, simple, and rapidly interchangeable parts.

Another object is to effect substantial savings in the cost of equipping a machine shop with knurling tools having a wide field of use.

Another object is a knurling tool of but few and simple parts which can be readily assembled, disassembled, repaired, replaced, interchanged, and reassembled, to perform a wide range of functions, and which is very efficient and durable in use.

Another object is a knurling tool which automatically releases the cutter to prevent injury thereto.

Other objects will appear from the detailed description which follows:

In the drawing comprising one sheet of ten figures, numbered Figs. 1 to 10 inclusive, certain embodiments of my invention, in the forms at present preferred, are variously set forth.

Fig. 1 is a side view of the knurling tool when assembled to cut a male knurl;

Fig. 2 is a front end view of the assembly of Fig. 1;

Fig. 3 is a side view of the knurling tool when assembled in reverse to cut a female knurl;

Fig. 4 is an enlarged cross-section of a fragment taken along the line 4—4 of Fig. 1, looking in the direction of the arrows;

Fig. 5 is an enlarged cross-section of a fragment taken along the line 5—5 of Fig. 1, looking in the direction of the arrows;

Fig. 6 is an enlarged cross-section of a fragment of Fig. 5;

Fig. 7 is an enlarged end view partly in cross-section taken along the line 7—7 of Fig. 1, looking in the direction of the arrows;

Fig. 8 is a cross-section taken along the line 8—8 of Fig. 7, looking in the direction of the arrows;

Fig. 9 is an enlarged cross-section of a fragment taken along the line 9—9 of Fig. 1, looking in the direction of the arrows; and Fig. 10 is a side view of a fragment of an assembly, showing a modified form of the invention.

Like reference characters designate corresponding parts throughout the several figures of the drawing.

The knurling tool 20 includes the box 21 which supports two adjustable arm blocks 22 and 23 which carry the arms 24 and 25. The knurls 26 and 27 are rotatably mounted upon the sleeves or bushings 28 and 29 between the upper jaw 30 and lower jaw 31 of the arm 24 or 25. The knurls 26 and 27 and the sleeves 28 and 29 preferably are made of steel of the same quality, such as tool steel, so that each sleeve is as hard as its associated knurl.

The box 21 is elongated and is bored from bottom to top and counterbored from the bottom to provide a hole which is then female threaded at 32 to receive the male threaded end 33 of a shank 34. Shanks of various sizes and either straight 35 (Fig. 3) or tapered 36 (Fig. 1) may be provided, which may be used interchangeably so that the knurling tool 20 may be fitted to the tail stock 37 of a lathe, or to the hole in the turret of a Fox lathe (not shown), or fitted so that it may be used with a hand screw machine (not shown) or in the turret of a turret lathe (not shown), all of which devices are well-known in the art. A clamping holder 38 provided with a split lug lug 39 threaded at 40 and an Allen locking screw 41 capable of being tightened to secure the holder upon the spindle of the tail stock or tail stand 37 of a lathe, may also be provided. The hole through the box 20 permits the work 42 to feed through the knurling tool as the work 42 is knurled thus permitting the knurling of a substantial length of the work 42.

Either straight cut or diagonally cut knurls may be mounted interchangeably upon the sleeves 28 and 29 dependent upon whether it is desired to cut a straight or diamond patterned knurl upon the work.

An inverted T-shaped channel 43 is cut crosswise in the top of the box 21 to receive and accommodate the arm blocks 22 and 23 which are each provided with an inverted T-shaped fin or tongue 44 whose several dimensions are slightly smaller than the corresponding dimensions of the T-shaped channel 43 formed in the box 21, to provide sliding clearance for the tongues 44 when positioned in the channels 43.

Each arm block 22 or 23 may be made in two pieces consisting of an arm holder 45 and an arm 24 or 25 which is seated in a channel 46 formed in the upper edge face of the arm holder 45. The arm 24 or 25 is fastened in the channel 46 by means of Allen screws 47 positioned in counterbored holes 48 which are threaded at 49 to receive the Allen screws 47. The rack 50 is push fitted in the slot 51 which overlies the heads of the Allen screws 47. The rack 50 can be pried out of the slot 51 as by means of a screw-driver.

By making the arm blocks 22 and 23 in two pieces, narrower stock can be used to form the arms 24 and 25 than is necessarily required to make the arm holders 45. If the arm 24 or 25 and arm holder 45 were made in one piece, it would be necessary to use stock as wide as the arm holder 45 which is approximately double the width of the arms 24 and 25, and then mill away a large part of the stock to fashion the arm 24 or 25. By making the arms separately, interchangeable pairs of detachably attachable arms of different lengths may be provided, and by selecting longer or shorter arms for mounting in the channels 46 of the arm holders 45 different lengths of work 42 may be knurled.

The knurl 26 or 27 and sleeve 28 or 29 may be hardened to a specified degree of hardness as for example according to the Rockwell scale. Because the sleeves 28 and 29 and their associated knurls 26 and 27 are equally hard, the rotation of the knurl about the sleeve will not wear out the sleeve.

Each arm 24 and 25 is provided with a sleeve hole 52 slightly larger in diameter than the outside diameter of the sleeve 28 or 29 for clearance. This prevents the sleeve from freezing in its sleeve hole, and facilitates easy removal and renewal of the sleeve 28 or 29. By making the sleeve hole 52 slightly larger than the outside diameter of the sleeve, any strain upon the Allen screw 53 as it draws the sleeve into the sleeve hole 52 is eliminated, thus relieving tension upon, and reducing the risk of stripping, the thread of the Allen screw 53.

The sleeves 28 and 29 are female threaded at 54 to receive the male threaded stem 55 of a screw 53 which has an Allen head whose outside diameter is preferably the same as the outside diameter of the sleeves 28 and 29. Preferably each thread of the female thread 54 of the sleeve 28 or 29 is flat at the peak 56 and sharp at the root 57 thereof, while the stem 55 of screw 53 is provided with a sharp thread 58. The flat peak 56 makes the sleeve 28 or 29 easier to tap and insures that the sleeve cannot freeze to the sharp thread of the male threaded stem 55 of the screw 53. The sleeve hole 52 is drilled and tapped at 59 to receive the male threaded stem 55 of the Allen head screw 53. The threaded hole 59 is deep enough to allow clearance for the end of the stem 55 of the Allen head screw 53, so that the stem 55 of the screw 53 cannot lock in the bottom of the hole 59. The screw 53 is not as hard as its sleeve 28 or 29, so that if the stem 55 breaks off in the hole 59, the broken stem 55 of the screw 53 being softer than tool steel can always be drilled out and the broken screw replaced.

If for any reason, such as lack of lubrication, or the entrance of a burr the knurl 26 or 27 freezes upon its sleeve 28 or 29, the sleeve will revolve with the knurl to unscrew the Allen head screw 53.

The box 21 is equipped with two shafts 60 and 61 for mounting pinion gears 62 and 63, each pinion gear being adapted to mesh with a rack 50 push fitted to and removably nesting in a slot 51 cut in the underface of its associated arm holder 45, so that when the shaft 60 or 61 is turned to rotate the pinion gear 62 or 63, the rack 50 in mesh with the pinion gear 62 or 63 slidably adjusts the position of the arm holder 45 relative to the box 21, to adjust the spacing between the knurls 26 and 27 according to the diameter of the work 42 which is to be knurled. The arm blocks 22 and 23 are reversible in the box 21 (compare Figs. 1 and 3), so that a male knurl 64 may be formed upon a rod 42 or the like, or an internal or female knurl 65 may be formed upon the internal wall or inner-face of a ring 66 or the like.

The box 21 is bored at 67 at spaced intervals to receive the shafts 60 or 61 of the pinion gears 62 or 63, and is counterbored at 68 from one side to receive the pinion gears 62 and 63 and to nest the enlarged head 69 of the shaft 60, which is free to rotate therein. The shoulder 70 on the end of the enlarged head 69 seats against the face of the box 21 to position the pinion gear 62 or 63 relative to the rack. The box is counterbored at 71 from the opposite side to receive a thrust washer 72 which is press fitted upon the shaft 60 or 61 and turns therewith in the bearing formed by the counterbored opening 71. Each pinion gear 62 or 63 is detachably mounted upon the shaft 60 or 61 and is provided with a boss 73 which is slotted at 74 to receive a crosspin 75 which is pinned through the shaft 60 or 61 so that when the crosspin 75 engages the slot 74 in the boss 73 the pinion gear 62 or 63 is locked upon the shaft. The head 69 of the shaft 60, 61 is provided with an Allen socket 76 to receive an Allen adjusting wrench for turning the shaft 60 or 61 and its associated pinion gear 62 or 63 which being in mesh with the rack 50 moves the arm block 22 or 23 in or out to adjust the spacing between the knurls 26 and 27 to work of any size within the working limits of the knurling tool 20. The arm blocks 22 and 23 when adjusted may be locked in selected position by applying tension to the grub screws 77 which are threadably mounted in the holes 78 which are drilled and tapped in the box 21 at right angles to the inverted T-shaped channel 43. The grub screws 77 are adjustable to force the soft metal plugs 79 which are fitted upon the ends of the grub screws 77 against the face of the side wall of the tongue 44 to prevent any change of position of the arm block 22 or 23 until such time as its associated grub screw 77 is loosened to remove pressure from the metal plug 79. The plugs 79 are made of brass or other soft metal so that the plug will not mutilate the face of the tongue 44. The plug 79 is long enough so that when pushed outwards against the tongue 44 the plug will not fall out of the tap clearance hole.

The face of the box may be provided at 80 and 81 with calibration points which may be read against the scale markings 82 and 83 which may be calibrated upon the edge faces of the arm holders 45 so as to furnish any preferred system of scale readings indicative of the spacing between the knurls and/or of the diameter of the work which the knurls are set to knurl.

By making the arm blocks 22 and 23 reversible and providing pairs of arms 24 and 25, of different lengths, and by providing interchangeable knurls, a wide range of knurling tools of different sizes and which can be used for various purposes can be developed by mounting the proper knurls in a pair of arms of the proper length upon the arm holders 45—45 and by mounting the arm holders 45—45 upon the box 21 to form a tool capable of making either a male knurl 64 or a female knurl 65 thus producing a knurling tool 20 which can be utilized for many different purposes and for knurling a large variety of work and many sizes thereof, thereby effecting substantial economies in the cost of equipping a machine shop with a wide range of knurling tools.

What is claimed is:

1. In a knurling tool and in combination, an elongated carrier having a T-shaped channel formed in and extending along the top thereof, a central opening formed in the bottom of the carrier and merging with said channel, said opening being female threaded, a pair of arm blocks, each arm block having a T-shaped tongue formed at the lower end thereof conforming in reverse configuration to the shape of but slightly smaller in dimensions than the T-shaped channel whereby said tongues engage in said channel with sufficient clearance to effect a sliding fit and vary the spacing between said arm blocks, a pair of arms, each arm being formed from metal stock substantially thinner than the arm blocks, each arm block having a channel formed therein for seating one of said arms upon said arm block, screws extending through said arm blocks and into said arms for detachably securing said arm to its said arm block, each arm being bifurcated at its upper end, a pair of knurling rolls, said knurling rolls being oppositely rotatably mounted in spaced relation between the forks of the bifurcated upper ends of their respective arms, said T-shaped tongues being reversible end for end in the T-shaped channel to selectively position said knurling rolls for cutting either male or female knurls, and means including a rack and pinion for sliding the arm blocks to and fro along the T-shaped channel to vary the spacing between the knurls.

2. In a knurling tool and in combination, a knurl supporting arm, said arm being bifurcated at the upper end thereof to form upper and lower spaced jaw members, said lower jaw having a bored and counterbored hole formed therein, said upper jaw having a hole therein concentric with said counterbore, a knurl having a central opening formed therein substantially equal in diameter to the diameter of said counterbore, and means for detachably rotatably mounting said knurl between said spaced jaw members comprising a sleeve extending through the central opening in said knurl and nesting in said counterbore with sufficient clearance to effect a sliding fit and to axially align the opening in the sleeve with the hole bored in said lower jaw, a machine screw having an enlarged Allen head journalled to rotate in the hole in the upper jaw, the sleeve and the hole bored in the lower jaw being threaded to receive the threaded stem of said screw, the stem of said screw being shorter than the combined length of the sleeve and the threaded hole to eliminate freezing of the screw in said hole, and the metal composing said screw being of lesser hardness than the metal composing said sleeve and said jaw members.

3. In a knurling tool and in combination, a knurl supporting arm, said arm being bifurcated at the upper end thereof to form upper and lower spaced jaw members, said lower jaw having a bored and counterbored hole formed therein, said upper jaw having a hole therein concentric with said counterbore, a knurl having a central opening formed therein substantially equal in diameter to the diameter of said counterbore, and means for detachably rotatably mounting said knurl between said spaced jaw members comprising a sleeve extending through the central opening in said knurl and nesting in said counterbore with sufficient clearance to effect a sliding fit and to axially align the opening in the sleeve with the hole bored in said lower jaw, a machine screw having an enlarged head journalled in the hole in the upper jaw, the sleeve and the hole bored in the lower jaw being threaded to receive the threaded stem of said screw, the stem of said screw being shorter than the combined length of the sleeve and the threaded hole to eliminate freezing of the screw in said hole, and the metal composing said screw being of lesser hardness than the metal composing said sleeve and said jaw members.

4. In a knurling tool and in combination, an arm bifurcated at its free end to form an upper and a lower jaw member, said jaw members being arranged in oppositely spaced relation, an axle supported between said jaw members, said axle including a sleeve and a machine screw having an enlarged head and having a stem longer than said sleeve, said sleeve being internally threaded, the stem of said screw passing through said sleeve with a screw fit and projecting beyond the end of said sleeve to complete said axle, said jaw members having axially aligned holes formed therein defining bearings for supporting the opposite ends of said axle, the hole in said lower jaw member being stepped at its inner end, the inner end of said hole being longer than, and being internally threaded to receive, the projecting end of the stem of said screw, said screw being variously operable to draw said sleeve into and out of said bearings, a knurl rotatably supported upon said axle, said sleeve being tempered to substantially the same degree of hardness as said knurl, and said screw being tempered sufficiently softer than the sleeve and the knurl to facilitate removal of a broken screw.

5. In a knurling tool and in combination, an elongated carrier having a T-shaped channel formed in and extending along the top thereof, a central opening formed in the bottom of the carrier and merging with said channel, said opening being female threaded for attachment to different interchangeable male threaded carrier supporting shanks, a pair of arm blocks, each arm block having a T-shaped tongue formed at the lower end thereof conforming in reverse configuration to the shape of but slightly smaller in dimensions than the T-shaped channel whereby said tongues slidably engage said channel and are movable therealong to vary the spacing between said arm blocks, each arm block having a channel formed in the top face thereof narrower than the width of the arm block, a pair of arms, each arm being formed from metal stock narrow enough to nest the arm with a sliding fit in the channel in the top face of one of the arm blocks, screws extending through said arm blocks and into said arms for detachably securing said arms to said arm blocks, each arm being bifurcated at its upper end, a pair of knurling rolls, said knurling rolls being oppositely rotatably mounted in spaced relation between the forks of the bifurcated upper ends of their respective arms, said T-shaped tongues being reversible end for end in the T-shaped channel with said knurling rolls facing inwards to cut an outside knurl and outwards to cut an inside knurl, and means including a rack and pinion for sliding the arm blocks to and fro along the T-shaped channel to vary the spacing between the knurling rolls.

6. In a knurling tool and in combination, an elongated carrier having a central opening extending through the carrier from top to bottom, said opening being female threaded to receive different interchangeable male threaded carrier supporting shanks, a T-shaped channel formed in said carrier and extending diametrically across and merging with said central opening, a pair of arm blocks, each arm block having a T-shaped tongue formed at the lower end thereof conforming in reverse configuration to the shape of but slightly smaller in dimensions than the T-shaped channel whereby said tongues slidably engage said channel and are movable therein radially relative to said central opening to vary the spacing between said arm blocks, a pair of arms, each arm being formed from metal stock of a standard thickness but which is substantially thinner than the width of the arm blocks, each arm block having a channel formed therein substantially equal in width to the thickness of the stock of the arm blocks for receiving and seating one of said arm blocks, screws extending through said arm blocks and into said arms for detachably securing said arms to said arm blocks, each arm being bifurcated across its upper end, a pair of knurling rolls, said knurling rolls being oppositely rotatably mounted in spaced relation between the forks of the bifurcated upper ends of their respective arms, said T-shaped tongues being reversible end for end in the T-shaped channel to position said arm blocks with said knurling rolls facing inwards to cut a male knurl and outwards to cut a female knurl, and means including a rack and pinion for separately sliding each arm block radially to and fro along the T-shaped channel to vary the spacing between the knurling rolls.

7. In a knurling tool and in combination, an elongated carrier having a T-shaped channel formed in and extending along the top thereof, a central opening formed in the bottom of the carrier and merging with said channel, said channel extending radially outwards from opposite sides of said central opening, said central opening being female threaded for attachment to different interchangeable male threaded carrier-supporting shanks, a pair of arm blocks, each arm block having a T-shaped tongue formed at the lower end thereof conforming in reverse configuration to the shape of but slightly smaller in dimensions that the T-shaped channel, said tongues engaging in said channel with sufficient clearance to effect a sliding fit and vary the spacing between said arm blocks, a pair of arms, each arm being formed from metal stock substantially thinner than the arm blocks, each arm block having a channel formed therein for seating one of said arms upon said arm block, screws extending through said arm blocks and into said arms for detachably securing said arms to said arm blocks, each arm being bifurcated at its upper end, a pair of knurling rolls, said knurling rolls being rotatably mounted in spaced relation between the forks of the bifurcated upper ends of their respective arms, said T-shaped tongues being reversible end for end in the T-shaped channel to selectively position said knurling rolls for cutting either male or female knurls, and a separate rack and pinion for each arm block operable to slide said arm block radially in and out along the T-shaped channel to adjust the knurling rolls to the diameter of the work.

8. In a knurling tool and in combination, an elongated metal carrier having a central opening extending through the bottom of the carrier, said opening being female threaded for attachment to different interchangeable male threaded supporting shanks, an undercut channel formed in and extending across the top of the carrier, said channel merging with said central opening and extending radially outwards from the diametrically opposite sides thereof, a pair of metal arm blocks, each arm block having a tongue formed at the lower end thereof conforming in reverse configuration to the shape of and slightly smaller in dimensions than the undercut channel, said tongues slidably engaging said undercut channel and being movable therealong radially relative to said central opening to change the spacing between the arm blocks, a pair of arms, each of said arms being formed from standard metal stock of substantially lesser thickness than the arm blocks, each arm block having a channel formed therein substantially equal in width to the thickness of the arm stock, said channel extending along the top of the arm block to form a seat for one of said arms, each arm being seated in the channel formed in its associated arm block to mount said arm upon said arm block, screws extending through said arm blocks and into said arms for detachably securing said arms upon their respective arm blocks, each arm being bifurcated at the upper end thereof, a pair of knurling rolls, said knurling rolls being mounted to rotate in spaced relation between the forks of the bifurcated upper ends of their respective arms, said tongues being reversible at will in the undercut channel to position said arms blocks with the knurling rolls facing inwards to cut an outside knurl and outwards to cut an inside knurl, said arm blocks being operable when moved radially relative to said central openings to always apply the knurling rolls to the work at the diameter thereof, the work when knurled upon the outside feeding towards and into said central opening and the work when knurled upon the inside feeding around and beyond the arm blocks and towards the elongated carrier, and means including a rack and pinion for moving the arm blocks radially to and fro in the undercut channel to variously regulate the spacing between the knurling rolls.

References Cited in the file of this patent

UNITED STATES PATENTS

| Number | Name | Date |
| --- | --- | --- |
| 656,952 | Dornheim | Aug. 28, 1900 |
| 930,662 | Graham | Aug. 10, 1909 |
| 2,453,722 | Moss | Nov. 16, 1948 |
| 2,494,073 | Weaver | Jan. 10, 1950 |